Dec. 13, 1949     L. METZGER     2,491,415
VEHICLE STAKE BODY LOCK
Filed Feb. 10, 1947
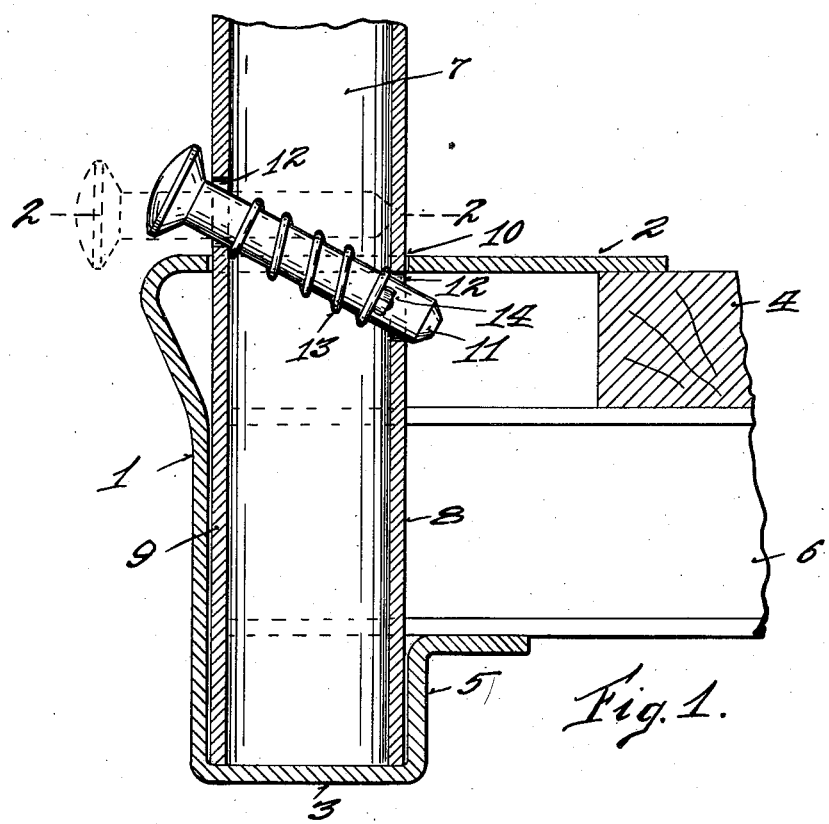
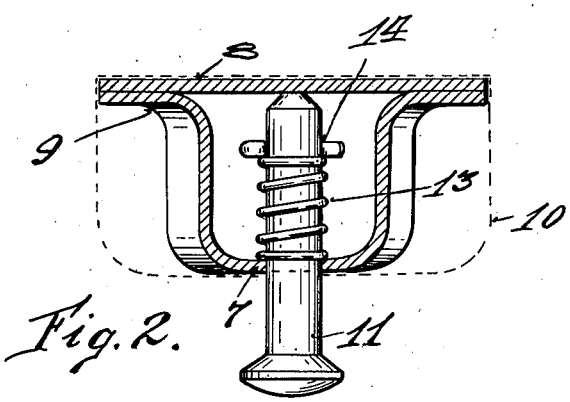
INVENTOR.
Louis Metzger
BY Patented Dec. 13, 1949

2,491,415

UNITED STATES PATENT OFFICE 2,491,415

VEHICLE STAKE BODY LOCK

Louis Metzger, Galion, Ohio, assignor to The Perfection Steel Body Company, Galion, Ohio, a corporation of Ohio Application February 10, 1947, Serial No. 727,478

2 Claims. (Cl. 296—43)

1

This invention relates to improvements in a vehicle stake body lock. The stakes following the common practice, each individually at one end is removably engaged and seated within a socket in a vehicle body or platform to extend perpendicularly therefrom and in a given number are arranged at relative spacing apart in a row as about the rim of the vehicle platform for confining the cargo placed upon the platform or employed for sustaining rails or as elements of panels for the body sides to convert the body or platform for different needs and uses.

An object of the invention is to provide an improved stake locking device of simple and durable construction for secure anchorage of the stake in a socket in the rim or frame work of a vehicle platform easily and conveniently operable for quick removal or replacement of the stake.

Another object is to provide a stake lock as a heavy pin traversing the stake and sustained against dislodgement from the stake by a spring thereabout and confined within the stake, the pin protrudable from the stake for engagement with the rail of the vehicle platform into which the stake is socketed to lock the stake against withdrawal, and the pin held firmly by the spring in either the stake locking or unlocked position.

Another object is to provide a stake with a bolt extending transversely therethrough and movable to obstructively withhold removal of the stake from a stake sustaining socket in the frame work of a vehicle body platform.

Various other features and advantages will be readily apparent from the following description of the drawings accompanied herewith and forming a part hereof, depicting a preferred embodiment of the invention, in which:

Figure 1 is a central vertical section of the lower portion of a stake and end portion of a vehicle body platform into which the stake is socketed with the improved lock carried by the stake for obstructively withholding the stake from removal from the platform socket shown in elevation.

Figure 2 is a section taken on line 2, 2, Figure 1, through the stake with the lock bolt in a stake non-locking position.

The body or platform into which the stakes are socketed and sustained may be of a specific or conventional type of construction and adaptable for various classes of vehicles as for an automobile truck mounted as a stationary or dumping unit, a trailer or farm wagon. The stakes are socketed into the frame work of the body or platform in various arrangements to confine the cargo

2 stationed upon the platform, or are employed as means for supporting side rails and supporting elements for side panels to convert the body for different needs and uses.

The platform construction illustrated is selective of a specific commercial type, in which the stakes for the opposite longitudinal sides and rear end of the platform do not extend therethrough but are sustained and pocketed within a rail of a frame of the platform and therefore the stake lock in order to be carried by the stake must be accessible from above the socket in the platform into which the stake is sustained.

Referring to the drawings, 1 indicates a side rail of a frame as a rim for the vehicle platform, of channel form in cross-section, thereby comprising a web portion and a pair of opposite flanges 2 and 3 extending at right angles from the web inward of the frame. The upper flange 2 extends horizontally with the flooring boards 4 of the platform and slightly overlaps an end board of the flooring. The bottom flange 3 terminates with a right angle bend 5 inwardly of the channel of the rail thereby providing a step longitudinally of the rail which serves as a ledge for sustaining an end of a bolster 6 engaged into the channel of the rail, which is welded or otherwise rigidly secured to the step or ledge of the lower flange as one of a plurality of bolsters correspondingly engaged into the rail and relatively determinately spaced apart for the length of the platform all extending cross-wise of the frame and upon which the floor boards 4 are mounted.

The step or off-set of the lower flange 3 and the web of the rail form a channel or trough longitudinally for the full length of the rail to socket and laterally confine the lower end of the stake 7 extending transversely into the channel of the rail and traversing a slot or aperture 10 through the top flange 2.

The off-setting or a step form of the lower flange of the rail aside from providing a rest or support for the ends of the bolsters materially reinforces and strengthens the rail so that it can be constructed of a lighter or reduced gauge thickness of sheet metal, correspondingly reducing the weight of the platform without sacrifice in durability.

The stake is preferably of double plate structure, comprising a flat plate 8 for the inner or base side of the stake and spanning the channel of a centrally longitudinally ribbed plate 9 with the flanges thereof overlying and coinciding with the edges of the flat base plate 8 and welded thereto.

The rib of the plate 9 widens at the lower end of the stake for a length slightly in excess of the depth of the socket or width of the rail in which the stake is stationed to assure a durable, rigid and secure anchorage.

The stake is locked or latched in its socketed connection within the rail by a lock bolt or pin 11 traversing the stake through oblong apertures 12, 12, respectively, in the rib of the plate 9 and base plate 8 and relatively in a staggered arrangement to cant or incline the bolt to bring its forward or shank end when protruding from the stake beneath the upper flange 2 of the rail to obstruct stake removal from its pocketed connection within the rail with the head end of the bolt protruding from the rib side of the stake above the rail for convenient access and hand hold upon the bolt for releasing or making a locking connection with the rail.

The bolt is surrounded by a spring 13 housed within the stake. One end thereof bears against the inner side of the rib of the stake and the opposite end against a cotter pin 14 extended through and clipped to the bolt. The spring with the cotter pin prevents bolt dislodgment from the stake and movably secures the bolt to the stake so that it can be canted or inclined for registry with the aperture 12 in the base plate 8 of the stake to protrude therefrom and underlie the top flange 2 of the rail to obstruct removal of the stake from the rail. Upon withdrawing the bolt from the aperture in the base plate of the stake it can be swung upwardly as to a horizontal plane or out of registry with the aperture in the base plate 8 for abuttingly engaging its forward end against the inner side of the base plate of the stake to hold the same in an unlocked position, for stake withdrawal from or replacement in the rail. The spring tension sustains the bolt in a central position within the stake so that in inserting the stake under a striking force against the base of the rail socket it is possible to actuate the bolt for self-locking.

The bolt and spring are readily assembled within the stake and the end coils of the spring are of a diameter to span the oblong aperture 11 through the ribbed section of the stake and thus with the cotter pin prevents the bolt from being dislodged from the stake. The locking mechanism is an inexpensive addition to the stake exceedingly simple in construction, very effective, easily manipulated and under the pressure of the spring the bolt is firmly held in either locked or unlocked position.

Having described my invention, I claim:

1. A metal stake having its base end of hollow structure and adapted for socketing within a side rail of a vehicle platform, the rail of channel form in cross-section having a flange in plane with the upper surface of the platform and apertured for socketing the base end of the stake therein, a bolt angularly traversing the base end of the stake through relatively off-set apertures in opposite walls thereof to extend the head of the bolt from one side of the stake above said apertured flange of the platform rail and the shank end protrudingly from the opposite side and within the platform rail beneath said apertured flange for engagement therewith to lock the stake against removal therefrom, and a spring about the bolt, connecting therewith and confined within the stake to prevent removal of the bolt from the stake and resistively sustain the bolt in a retracted position when shifted out of line with its stake traversing angle for insertion and removal of the stake from the rail.

2. A vehicle body platform stake having a base end of hollow structure engageable within a socket in the platform to sustain and extend the stake perpendicularly from the platform, a bolt angularly laterally traversing the base end of the stake for locking the stake to the platform with its head end protrudingly above the plane of the platform and its shank end within the platform and a spring about and connecting with the shank of the bolt confined within the hollow base end of the stake to resistively sustain the bolt in a retracted position with its shank end abutting the interior of the stake when disposed out of its angular stake traversing plane for insertion and removal of the stake to and from the platform socket.

LOUIS METZGER.

REFERENCES CITED

The following references are of record in the file of this patent:

UNITED STATES PATENTS

| Number | Name | Date |
| --- | --- | --- |
| D. 144,900 | Boepple | June 4, 1946 |
| 167,976 | Beach | Sept. 21, 1875 |
| 308,802 | Roberts et al. | Dec. 2, 1884 |
| 1,394,798 | Speed | Oct. 25, 1921 |
| 1,548,418 | Edlich | Aug. 4, 1925 |
| 2,447,471 | Wagner | Aug. 17, 1948 |